United States Patent [19]

Banchieri

[11] 4,210,188
[45] Jul. 1, 1980

[54] PNEUMATIC TIRES FOR MOTOR VEHICLES HAVING COMPRESSION-STRESSED SIDEWALLS

[75] Inventor: Carlo Banchieri, Milan, Italy

[73] Assignee: Industrie Pirelli S.p.A., Milan, Italy

[21] Appl. No.: 895,067

[22] Filed: Apr. 10, 1978

[30] Foreign Application Priority Data

May 4, 1977 [IT] Italy ................................ 23148 A/77

[51] Int. Cl.² .............................................. B60C 13/00
[52] U.S. Cl. .................................. 152/353 C; 152/355
[58] Field of Search .................. 152/353, 354, 352 R, 152/353 C, 355, 361 R, 209 WT, 380, 398, 404, 379

[56] References Cited

U.S. PATENT DOCUMENTS

| 3,805,868 | 4/1974 | Tangorra | 152/353 C |
| 3,870,095 | 3/1975 | Tangorra | 152/353 C |
| 3,895,668 | 7/1975 | Tangorra | 152/353 C |

Primary Examiner—Richard A. Bertsch
Attorney, Agent, or Firm—Stevens, Davis, Miller & Mosher

[57] ABSTRACT

A pneumatic tire having a generally trapezoidal section and sidewalls which are predominantly under compression under load is provided with non-reinforced sidewalls made of an elastomeric composition having a dynamic modulus of elasticity between 8 and 13 megapascal units and the tangent of the loss angle is between 0.03 and 0.15. By controlling the ratio between the absolute value of the modulus and the relative loss angle, the tire has optimum mechanical characteristics.

7 Claims, 3 Drawing Figures

PNEUMATIC TIRES FOR MOTOR VEHICLES HAVING COMPRESSION-STRESSED SIDEWALLS

This invention relates to pneumatic tires for motor-vehicles having compression-stressed sidewalls which are substantially devoid of any textile reinforcement and, preferably, are formed by an injection molding process.

A preferred type of these tires, the only one which at present has had any industrial success, constitutes the subject matter of a series of patents, in particular the Italian Pat. No. 928,502, No. 963,744, No. 979,349 corresponding to: U.S. Pat. No. 3,805,868 granted Apr. 23, 1974; U.S. Pat. No. 3,870,095 granted Mar. 11, 1975; U.S. Pat. No. 3,899,014 granted Aug. 12, 1975; the Italian patent application No. 23 423 A/73 filed Apr. 26, 1973 corresponding to U.S. Pat. No. 3,996,986 granted Dec. 14, 1976; and Italian patent application No. 21,351 A/75, filed on Mar. 18, 1975 corresponding to U.S. patent application Ser. No. 649,726 filed Jan. 16, 1976, now abandoned, the disclosures of which are incorporated herein by reference.

These tires have in general a trapezoidal section, with a top portion whose central part acts as a tread and extends laterally to determine the maximum tire width, the sidewalls flaring from the beads to the points of connection with the tread, and the top portion being provided with a substantially inextensible annular reinforcement which preferably extends laterally at least as far as the zone of connection of the sidewalls to said top portion. In all of their alternative embodiments, modifications and improvements, the tires of this type have in common the feature that when the tire is inflated, its sidewalls are prevailingly placed under compression and the compression is never totally released during the tire operation but, on the contrary, tends to increase.

The tire behavior and the mechanism through which the tire bears load are extremely complicated and not yet completely known.

The ability of bearing load is related, on one hand, to the pneumatic effect, namely to the pressure existing inside the tire and, on the other hand, to the elastic properties of the elastomeric material of which the tire, in particular its sidewalls, are made. In the sidewalls, there are zones having a mechanical behavior which can be described, with a certain approximation, as that of imperfect hinges and, besides the compressive stresses and deformations, bending stresses and deformations take place in said sidewalls which play an important role in the tire behavior.

The above described tires which, for the sake of brevity, will be hereinafter indicated as "the new tires," have remarkable technological advantages which have led to them being considered a radical progress in the field of pneumatic tires for motorvehicles. In fact, they not only support the vehicle efficiently and enable the vehicle to ride comfortably, but they also possess very high safety characteristics and can run in a deflated condition for long distances. Moreover, such tires are extremely cheap, partially because they are manufactured by relatively simple mechanical methods, such as injection molding without the need of providing a reinforcing material in the sidewalls.

However, it has been noted that the tires behavior and efficiency in their actual use on the road do not completely come up to expectations based on laboratory data and the theoretical considerations.

In particular, it has been determined that, after a certain time of use, during which the shape of the sidewalls retains the profile conditions originally planned, a permanent variation of the shape of the sidewalls is likely to occur, with a consequent degradation of the tire performance and a limitation of the possibility of its recapping.

A further disadvantage noticed is a tendency of the material forming the sidewall to soften owing to its increased service temperature, with a consequent sacrifice in tire behavior when the motorvehicle is driven.

It has now been found surprisingly that the above disadvantages can be eliminated and that the new tires will function better mechanically and have other improved technological characteristics if their sidewalls are formed from elastomeric compositions which are different from those hereintofore employed and, in particular, are different from those used for the sidewalls of conventional tires. This is also true with respect to tires whose sidewalls are prevailingly placed under compression and substantially not reinforced which are not disclosed in the aforesaid patents so the invention is applicable to all tires having sidewalls of that type and working in that way.

The discovery that higher quality tires of the above type having their sidewalls made of elastomeric materials different from those previously used has, on the other hand, raised a difficult technical problem. This problem consists in finding out, at least empirically, the reason for which some materials are not satisfactory and others are or, in other words, to single out the physical parameters of the materials to be used to eliminate the above cited drawbacks and to obtain the desired optimum technological and behavior characteristics. In fact, neither theory nor the preceding experience in tire manufacturing technique supplied a definition of the said parameters or a criterion to distinguish "a priori" the suitable materials from the unsuitable ones.

In fact, on one hand, none of the criteria valid for conventional tires applies to the new tires; on the contrary, the compositions more appropriate for the former are not appropriate for the latter. Further, the impossibility of formulating a theoretical treatment or of preparing a satisfactory mechanical model of these new structures, in spite of all efforts devoted to this aim in several years, has not provided a general teaching, representing a guide for locating the materials able to confer optimum characteristics to said tires.

Of course, as is true with respect to the common tires, laboratory experiments are not conclusive per se and sometimes not even accurately indicative of the actual behavior of a tire on the road. Indeed, such a correlation cannot be deduced theoretically or in the light of brief experimentation, but can be derived only from an appropriately co-ordinated and correctly analyzed wide practical experience.

Inter alia, as known, the behavior of elastomeric compositions containing natural or synthetic rubbers cannot be completely represented by a simple mechanical model, and a plurality of models is available, which comply more or less differently with the evaluation of different situations, trails and circumstances. Further to a laborious and long experience in the manufacture and use of the new tires and to the collection and co-ordination of a large amount of laboratory data and road behavior tests, it has now been found that a critical condition must be satisfied by the mechanical behavior of the elastomeric composition forming the sidewalls of the tires in order that the tire may have optimum mechanical characteristics. Specifically, it has been determined that the tires of the above described type having substantially trapezoidal section and having substantially non-reinforced sidewalls working under compression and bending possess optimum characteristics when the elastomeric composition forming the sidewalls has a compressive dynamic modulus, under cyclic sinusoidal stresses such that there is a certain quantitative ratio between the absolute value of the modulus and the relative loss angle.

This ratio can be graphically defined, and the definition, used in the present specification and in the claims, will be given by the position which the representative point of the considered elastomeric composition occupies in a diagram whose coordinates are respectively the real component of the compressive dynamic modulus under cyclic stresses, measured in stated conditions which will be described below, and the tangent of the loss angle which, as known, expresses the ratio between the imaginary component and the real component of the modulus of dynamic elasticity of the composition under consideration, which is therefore represented by a complex number (which, mathematically, is defined not only by its absolute value, but also by the "argument" which, in this case, is represented by the loss angle $\delta$).

Accordingly, the invention provides pneumatic tires whose sidewalls are prevailingly subjected to compression stresses and are substantially non-reinforced, and preferably pneumatic tires having a generally trapezoidal section, which have non-reinforced sidewalls and a top portion provided with a substantially inextensible annular reinforcement which preferably extends laterally as far as at least the zones of connection of the sidewalls to the top portion, the sidewalls flaring from the bead zone to the connection zone, the tires being characterized in that the sidewalls are formed of such an elastomeric composition that the quantitative ratio between the absolute value of the compressive dynamic modulus of the material and the relative loss angle is within the limits which will be indicated.

The limits are defined by the following quantitative conditions: the absolute value of the dynamic modulus of elasticity under consideration, measured in Megapascal (a unit which will be hereinafter indicated as "MPa" and which corresponds to a meganewton/m$^2$) must not be smaller than 8 and preferably not smaller than 9 and must not be greater than 13 and preferably not greater than 12, and the tangent of the loss angle (tg$\delta$) must not be smaller than 0.03 and preferably not smaller than 0.05 and must not be greater than 0.15 and preferably not greater than 0.11.

The invention will be better understood from the following description with reference to the accompanying drawings, in which.

Figure 1:
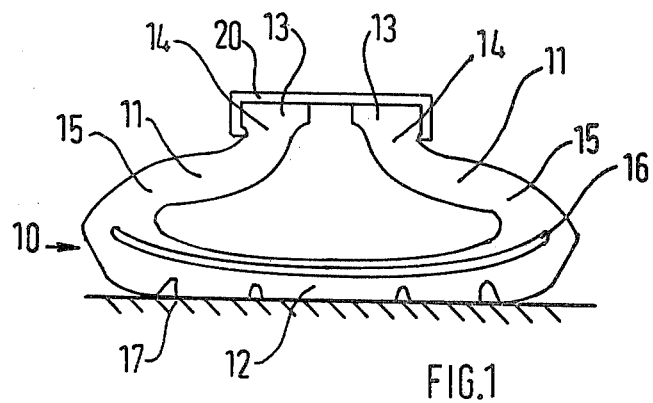
FIG. 1 is a section, taken in a meridian plane, of an embodiment of a tire of the described type, as illustrated in the cited prior patents.

With reference to FIG. 1, a tire 10 according to the invention comprises two sidewalls 11, 11' and a top portion 12. The sidewalls flare from two beads 13, 13' as far as the respective connections to the top portion and are substantially devoid of any reinforcement. Moreover, the sidewalls preferably comprise two portions of comparatively narrow section 14, 14' and 15, 15', situated in proximity of the bead and of the top portion, respectively, which represent zones of preferential bending or, "imperfect hinges." The top portion is provided with a substantially inextensible reinforcement 16 which extends preferably, at the two sides, as far as at least the zones of connection of the sidewalls to the top portion. The central part of the top portion, during the tire service, comes into contact with the ground 17 and acts as a tread. The structure and the elastomeric composition of the top portion are beyond the scope of the present invention.

The pneumatic tire is illustrated in the drawings in conditions of straightaway motion, namely under vertical load. Under such conditions, the sidewalls are substantially never subjected to tension, differently from what happens in the conventional tires, and are instead prevailingly subjected to compressive stresses, in addition to bending stresses. When the tire is inflated, its sidewalls are placed under compression in consequence of the inflation pressure and, when it is loaded, this compression is increased.

As can be seen, the tire section can be defined generally as trapezoidal. The top portion is larger than any part of the sidewalls. This basic structure of the tire may however be modified in view of particular purposes, and modified sections have been described for instance in U.S. Pat. No. 3,895,668, and in U.S. Pat. No. 4,004,628 of the same assignee.

The present invention applies also to said modified sections.

Preferably, the tire configuration complies with the following dimensional parameters:

angle of inclination of the sidewalls (namely the angle between the chord representing schematically the sidewall and the axis of rotation of the tire), when the tire is inflated but not loaded, ranging between 30° and 50°;

ratio between the two bases of the sectional trapezium ranging between 1:1.5 and 1:3;

length of the sidewalls (or more precisely of their chords) such that the ratio between the smaller base of the trapezium and each of said chords ranges between 1:0.3 and 1:3;

slenderness ratio (ratio between the sidewall thickness at its central zone and the development of the median line of the sidewall comprised between the point of connection of the sidewall to its corresponding bead and the point of connection of the sidewall to the tread) greater than 0.20 and preferably ranging between 0.25 and 0.35;

ratio between the minimum bending stiffness and the maximum bending stiffness of the sidewalls ranging from 0.6 to 0.01.

The reinforcement of the top portion is a preferably annular, substantially inextensible reinforcement of a generally known type, as an annular reinforcement made of textile threads or metal wires having any weaving or convenient textile structure, which can be increased or stiffened in proximity of the zones of connection to the sidewalls.

The invention concerns a pneumatic tire of the above indicated general type, irrespective of particular alternative structures or particular values of the dimensional ratios. For a better understanding of the critical conditions of the invention, some hints of methodological nature are appropriate. The elastic moduli under dynamic stresses, in particular sinusoidal stresses, are well known in the technique. It is also known that, in consequence of the non-linear character of the elastic behavior of rubber, the measured elastic moduli vary according to the measurement conditions; in other words, as regards cyclic stresses, in particular sinusoidal stresses, they depend on a certain number of factors, as the amplitude and the frequency of the stress, the possible pre-loading of the specimen, the thermal steady-state conditions of the specimen and so on. When it is wished to establish quantitative relationships, it is therefore necessary to specify the experimental conditions in which the dynamic moduli are measured.

It is also known that, before reading the measurements, the specimen is to be allowed to settle, so to say, because, in respect of a certain number of cycles of stresses, variations take place in the diagram of the hysteretic cycle of the specimen, which phenomenon is known as "Mullins effect." The considered measurements are referred to the well known linear Voigt model which in the event of strains or deformations applied to a specimen with a cyclic sinusoidal path, permits to determine a complex modulus and consequently an absolute value of the same, and a loss angle of the material. The validity of these determinations, in particular in connection with a compressive or tractive modulus, is actually limited to small deformations; however, said limitation does not constitute an obstacle in the present case.

The compressive elasticity modulus is therefore represented by a complex number $E^* = E' + jE''$ and the loss angle $\delta$ is defined by $\mathrm{tg}\,\delta = E''/E'$.

As regards a loss angle smaller than 15°, the absolute value ($E^*$) of the modulus can be compared to its real component $E'$. In the present case, as previously stated it will be seen that the loss angle remains well below 15°.

The measurement conditions of the compressive elastic modulus under dynamic oscillation, for the purposes of the present invention, are the following. A Dynamic Instron dynamometer (Model 125 0) is employed.

A cylindrical specimen is used, 29 mm in diameter and 25 mm in height, constituted by two "compression set" type small discs superimposed to each other (ASTM D 395-69).

Said specimen is situated between the loading cell and the operating piston of the dynamometer. A static pre-deformation of 10% (2.5 mm) is imparted to the specimen; then a cyclic sinusoidal deformation, having a frequency of 15 Hz and an amplitude of ±6% (±1.5 mm) is applied to it. The specimen is allowed to take a condition of thermal equilibrium with the surrounding external ambient, the room temperature being kept between 22° and 26° C., oscillations in these limits being admissible.

The temperature reached by the specimen is evaluated by means of a thermocouple arranged diametrically between the two discs of the specimen and connected to a thermal recorder on which also the room temperature is readable. The thermal insulation of the specimen from the metallic parts of the apparatus is ensured by two discs of an appropriate thermally insulating resinous material, having a diameter of 50 mm and a thickness of 5 mm, directly applied to said apparatus.

Figure 2:
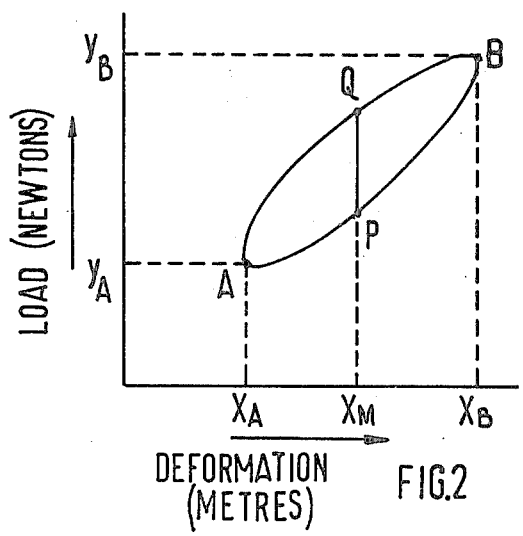
FIG. 2 is a diagram of the typical hysteretic cycle of an elastomeric composition adapted for use by the invention.

The two signals representing the load and the deformation, coming from the insturments of the dynamometer, are measured on the oscilloscope. In this way the hysteretic diagram of the considered elastomeric material is visualized in the manner shown in FIG. 2, in which the abscissae "x" represent the deformations, in meters, and the ordinates "y" represent the loads, in newton.

The minimum and the maximum loads of the cycle are represented in $y_A$ and $y_B$ and the minimum and maximum deformations in $x_A$ and $x_B$. Moreover, with the aid of the oscilloscope, it is possible to note the segment $\overline{PQ}$, shown in FIG. 2, which represents the difference between the maximum load and the minimum load of the hysteretic cycle at the deformation point $x_M$, which is the average between the maximum deformation $x_B$ and the minimum deformation $x_A$.

The absolute value of the dynamic modulus E, compared as said above to its real component $E'$, is calculated by the following formula:

$$E' = 10^{-6} \frac{y_B - y_A}{x_B - x_A} \frac{H_o}{S} \text{ MPa} \qquad (1)$$

where, as said, the modulus is measured in Megapascal, the loads are measured in newton, and the deformation in meters, and where $H_o$ is the height of the undeformed specimen in meters and S is the area of the specimen section in square meters.

The imaginary component $E''$ of the elasticity modulus is calculated by the following formula:

$$E'' = 10^{-6} \frac{\overline{PQ}}{x_B - x_1} \frac{H_o}{S} \text{ MPa} \qquad (2)$$

in which the symbols have the already indicated meaning and the measurement units are those already specified.

The tangent of the loss angle, "tg $\delta$," as said above, is calculated by the formula:

$$\mathrm{tg}\,\delta = E''/E' \qquad (3)$$

Figure 3:
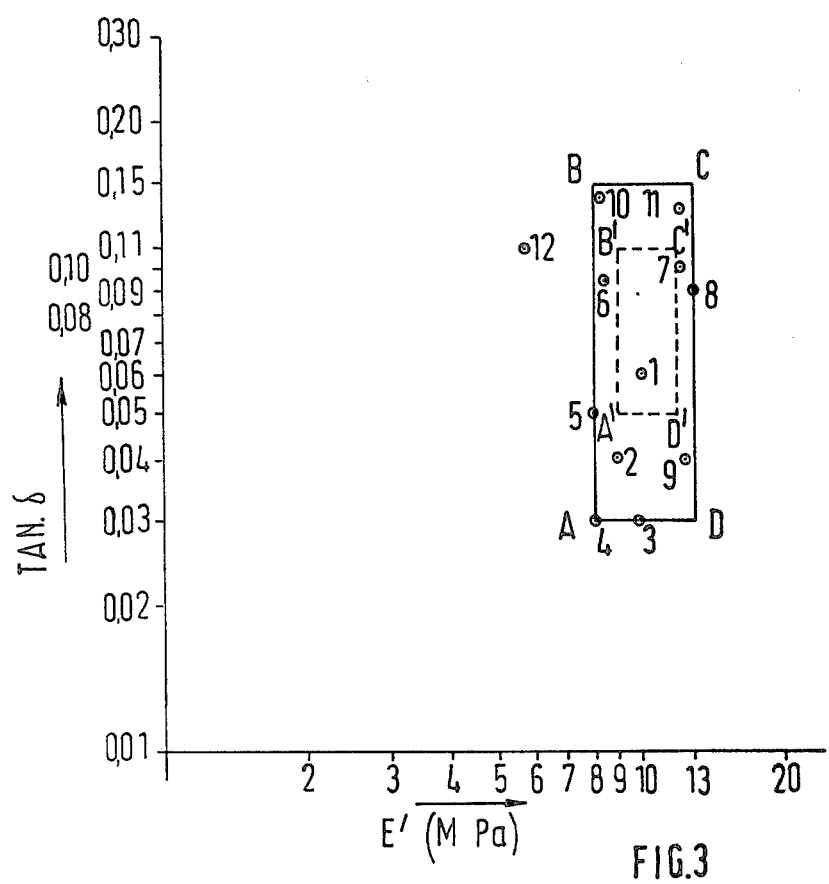
FIG. 3 defines graphically the range in which the elastomeric compositions are included.

FIG. 3 shows graphically the characteristics of the elastomeric composition, in a diagram in which the ordinates represent the tangents of the loss angle "$\delta$" and the abscissae represent the real component $E'$ of the compressive dynamic elasticity modulus, or the absolute value of said modulus (the two quantities being comparable, as said above, in the field of practical values) measured in Megapascal. For a better clearness, a logarithmic scale has been adopted, namely the abscissae are proportional to log $E'$ and the ordinates to log tg $\delta$, the scale of the abscissae beginning with value $E' = 1$ Megapascal and that of the ordinates with the value tg $\delta = 0.01$.

Rectangle ABCD represents the area into which fall the representative points of the elastomeric compositions which permit to obtain pneumatic tires of the above indicated type, provided with compression-subjected sidewalls, to which the present invention refers, having good behavior properties. Preference is given to the compositions whose representative points fall substantially inside said area and, more particularly, into the dashed area A'B'C'D', whose limits are $E'$ ranging between 9 and 12 and tg $\delta$ ranging between 0.05 and 0.11.

The critical conditions defined by the invention do not depend directly on the nature of the elastomeric material selected as a base of said elastomeric composition.

The elastomeric compositions practically used, which will be described in the following examples, are based on natural rubber or poly-isoprene and are obtained from blends of said rubbers with additives already known per se, the main of which is carbon black.

Obviously, the compositions contain also curing agents, known per se, and moreover may contain other ingredients of any kind, in particular, as it will be seen from the examples, known ingredients, as zinc oxide and anti-oxidizers. However, natural rubber is not always the only basic polymeric component; on the contrary, in the here reported examples, it is always associated with a synthetic elastomer which, in this case, is polybutadiene, or it is replaced by butadiene-styrene rubber, not treated or of the oil-extended type.

Anyhow, it is important to point out that the compositions described herebelow are indicated only by way of example, the invention being based on the determination of the critical conditions of mechanical properties which can be obtained through the most varied combinations of the components of the composition.

By way of illustrative example, twelve examples are reported in the following, the last of which is a comparison example while the first eleven are examples of embodiment of the invention.

Table I indicates the recipes of the composition according to the eleven examples of embodiment and to the comparison example, which is example 12 and which represents an elastomeric composition suitable to be used to manufacture sidewalls of conventional tires, and typically adopted to form said conventional tires.

It is to be noted that, as regards the elastomeric compositions 10 and 11, highly hysteretical per se—the relative specimens for the measurement of the compressive elastic modulus under dynamic oscillations were subjected to a static predeformation corresponding to 16%, rather than to 10%, so as to maintain the dynamic stress to levels analogous to those of the stress applied to the specimens of the other elastomeric compositions under consideration.

From the described FIG. 3 it can be noted that the representative points of the first 11 examples of embodiment, determined by reporting for each example, in the scale of the coordinate of the figure, the values of E' and of tg δ obtained from the measurements of the compressive dynamic elasticity modulus under cyclic stresses and with the above indicated modalities, fall in the area defined according to the invention, namely in rectangle ABCD. The representative points of example 1 fall in the preferred area A'B'C'D'. Exception is made for the representative point of example 12, which is out of area ABCD and does not reflect the quantitative limitations of absolute value of the compressive dynamic modulus and of the loss angle which have been specified above.

It is understood that the present invention is not restricted to what is described above, but that it includes any alternative embodiment which may be derived from the here indicated inventive concept.

What is claimed is:

1. A pneumatic tire for motor vehicles comprising a top portion provided with a substantially inextensible annular reinforcement member and sidewalls which are subjected to compression stresses and are substantially non-reinforced, wherein said sidewalls are formed at least partially by an elastomeric composition selected from the group consisting of elastomeric compositions having a compressive dynamic elasticity modulus of absolute value between 8 and 13 MPa and wherein the tangent of the corresponding loss angle is between 0.03 and 0.15.

2. The pneumatic tire of claim 1, wherein the absolute value of the compressive dynamic elasticity modulus of said elastomeric composition is not lower than 9 MPa and not greater than 12 MPa, while the tangent of the corresponding loss angle is not lower than 0.05 and not greater than 0.11.

3. The pneumatic tire of claim 1, characterized in that said elastomeric composition is based on natural rubber or polyisoprene.

4. The pneumatic tire of claim 3, characterized in that said elastomeric composition comprises polybutadiene as additional polymeric component.

5. The pneumatic tire of claim 1, characterized in that said elastomeric composition is based on butadiene-styrene rubber of the oil-extended type.

6. The pneumatic tire of claim 1 having a generally trapezoidal section.

7. The pneumatic tire of claim 1 wherein the said annular reinforcement extends laterally to the zones where the sidewalls and top portion connect.

|  | 1 | 2 | 3 | 4 | 5 | 6 | 7 | 8 | 9 | 10 | 11 | 12 |
|---|---|---|---|---|---|---|---|---|---|---|---|---|
| Natural Rubber | 80 | 60 | 60 | 100 | 100 | 80 | 80 | 80 | 80 |  |  | 75 |
| Polybutadiene | 20 | 40 | 40 |  |  | 20 | 20 | 20 | 20 |  |  | 25 |
| Oil-extended butadiene-styrene rubber |  |  |  |  |  |  |  |  |  | 100 |  |  |
| Butadiene-styrene rubber |  |  |  |  |  |  |  |  |  |  | 100 |  |
| Zinc oxide | 4 | 4 | 4 | 4 | 4 | 4 | 4 | 4 | 4 | 4 | 4 | 3.5 |
| Anti-oxidizer | 3 | 3 | 3 | 3 | 3 | 3 | 3 | 3 | 3 | 3 | 3 | 3 |
| Anti-ozone wax | 1.5 | 1.5 |  | 1.5 | 1.5 | 1.5 | 1.5 | 1.5 |  | 1.5 | 1.5 | 2 |
| Stearic acid | 2 | 2 | 2 | 2 | 2 | 2 | 2 | 2 | 2 | 2.5 | 2.5 | 1.5 |
| Carbon black No. 330 |  |  |  |  |  |  |  |  |  | 60 | 60 | 42 |
| Carbon black No. 550 |  | 50 | 45 |  |  |  |  | 45 |  |  |  |  |
| Carbon black No. 660 | 55 |  |  | 50 | 55 |  |  |  |  |  |  |  |
| Carbon black No. 375 |  |  |  |  |  | 45 | 45 |  |  |  |  |  |
| Carbon black No. 339 |  |  |  |  |  |  |  |  | 50 |  |  |  |
| Precipitated silica | 10 |  |  | 10 | 5 | 10 |  |  |  |  |  |  |
| Aromatic oil |  |  |  |  |  |  |  |  |  |  |  | 4 |
| Phenol resin |  |  |  |  |  | 5 | 10 |  |  |  |  |  |
| Disproportionated colophony |  |  |  |  |  |  | 5 |  |  |  |  |  |
| D.B.Q.D. |  |  |  |  |  |  |  |  |  | 0.5 |  |  |
| Sulphur donor |  |  |  |  |  |  |  | 1 |  |  |  |  |
| Triazine | 1 |  |  | 1 | 1 |  |  |  |  |  |  |  |
| H.M.T. |  |  |  |  |  | 0.75 | 0.5 | 1 |  |  |  |  |
| T.M.T.D. |  |  |  |  |  |  |  |  |  | 0.3 |  |  |
| O.B.T.S. | 1.5 | 2.5 | 2.5 | 1.5 | 1.5 | 2.5 | 2 | 1.5 | 1.5 | 1 | 1 | 0.7 |
| Sulphur | 1.5 | 1.75 | 2.5 | 2 | 1.5 | 1.75 | 2.5 | 2.5 | 2.5 | 1.75 | 1.75 | 2.5 |

UNITED STATES PATENT AND TRADEMARK OFFICE
CERTIFICATE OF CORRECTION

PATENT NO. : 4,210,188
DATED : July 1, 1980
INVENTOR(S) : Carlo BANCHIERI

It is certified that error appears in the above-identified patent and that said Letters Patent are hereby corrected as shown below:

Col. 5, line 66, change "insturments" to ---instruments--

Col. 6, line 32, Formula (2), change "$X_B - X_1$" to ---$X_B - X_A$---

Col. 7 and 8, last page Table, line 56, in the Section entitled "Sulphur donor", the "1" in Col. 8 should be in Col. 9.

Signed and Sealed this

Twenty-first Day of October 1980

[SEAL]

Attest:

SIDNEY A. DIAMOND

Attesting Officer

Commissioner of Patents and Trademarks